(12) United States Patent
Sinivaara et al.

(10) Patent No.: US 7,688,772 B2
(45) Date of Patent: Mar. 30, 2010

(54) CONTROL OF A SHORT-RANGE WIRELESS TERMINAL

(75) Inventors: Hasse Sinivaara, Espoo (FI); Simon Black, Stretham (GB); Jonathan P. Edney, Willingham (GB); Christopher Kelly, Cambridge (GB)

(73) Assignee: Nokia Corporation, Espoo (FI)

( * ) Notice: Subject to any disclaimer, the term of this patent is extended or adjusted under 35 U.S.C. 154(b) by 397 days.

(21) Appl. No.: 11/630,159

(22) PCT Filed: Jun. 29, 2004

(86) PCT No.: PCT/FI2004/000401

§ 371 (c)(1),
(2), (4) Date: Jun. 15, 2007

(87) PCT Pub. No.: WO2006/000617

PCT Pub. Date: Jan. 5, 2006

(65) Prior Publication Data

US 2008/0194201 A1     Aug. 14, 2008

(51) Int. Cl.
*H04B 7/185* (2006.01)

(52) U.S. Cl. .................. 370/318; 370/338; 370/328; 370/311; 455/522

(58) Field of Classification Search .......... 370/310, 370/311–312, 318, 338, 328, 347, 350; 455/574, 455/517, 500, 41.2, 452.1–453, 522, 69, 455/502
See application file for complete search history.

(56) References Cited

U.S. PATENT DOCUMENTS

| | | | |
|---|---|---|---|
| 6,704,561 B2 * | 3/2004 | Kuroiwa | 455/343.1 |
| 2003/0012167 A1 | 1/2003 | Benveniste | |
| 2003/0158922 A1 | 8/2003 | Park | |
| 2003/0161279 A1 * | 8/2003 | Sherman | 370/328 |
| 2003/0210658 A1 * | 11/2003 | Hernandez et al. | 370/311 |
| 2005/0068934 A1 * | 3/2005 | Sakoda | 370/350 |
| 2006/0171362 A1 * | 8/2006 | Garg et al. | 370/338 |

FOREIGN PATENT DOCUMENTS

| | | |
|---|---|---|
| EP | 1408651 | 4/2004 |
| WO | WO 02/47321 | 6/2002 |

\* cited by examiner

*Primary Examiner*—Kamran Afshar
(74) *Attorney, Agent, or Firm*—Squire, Sanders & Dempsey, L.L.P.

(57) ABSTRACT

The invention relates to a method for controlling the operation of a short-range wireless terminal capable of operating in a first beacon-based network and in a second beacon-based network, and having an active state and a power save state in the first beacon-based network. For seamless operation in the two networks, the terminal moves to a power save state with respect to the first beacon-based network if operation in the second beacon-based network is required. However, the first beacon-based network is only informed that the terminal moves to a power save state and instead of powering down, the terminal becomes active in the second beacon-based network.

19 Claims, 5 Drawing Sheets

CONTROL OF A SHORT-RANGE WIRELESS TERMINAL

FIELD OF THE INVENTION

The invention relates to short-range wireless communication systems where beacon frames are broadcast. More specifically, the invention relates to control of a short-range wireless terminal capable of operating in at least two different networks.

BACKGROUND OF THE INVENTION

The current development towards truly mobile computing and networking has brought on the evolvement of various access technologies that also provide the users with access to the Internet when they are outside their own home network. At present, wireless Internet access is typically based on either short-range wireless systems or mobile networks, or both.

Short-range wireless systems have a typical range of one hundred meters or less. They often combine with systems wired to the Internet to provide communication over long distances. The category of short-range wireless systems includes wireless personal area networks (PANs) and wireless local area networks (WLANs). They have the common feature of operating in unlicensed portions of the radio spectrum, usually either in the 2.4 GHz Industrial, Scientific, and Medical (ISM) band or in the 5 GHz unlicensed band.

Wireless personal area networks use low cost, low power wireless devices that have a typical range of about ten meters. The best-known example of wireless personal area network technology is Bluetooth, which uses the 2.4 GHz ISM band. It provides a peak air link speed of one Mbps, and power consumption low enough for use in personal, portable electronics such as PDAs and mobile phones. Wireless local area networks generally operate at higher peak speeds of 10 to 100 Mbps and have a longer range, which requires greater power consumption.

Wireless LAN systems are typically extensions of a wired network, providing mobile users with wireless access to the wired network. Examples of wireless local area network technology include the IEEE 802.11a, which is designed for the 5 GHz unlicensed band, and uses orthogonal frequency division multiplexing (OFDM) to deliver up to 54 Mbps data rates; the 802.11b, which is designed for the 2.4 GHz ISM band and uses direct sequence spread spectrum (DSSS) to deliver up to 11 Mbps data rates; and the HIPERLAN Standard, which is designed to operate in the 5 GHz unlicensed band.

In wireless LAN technology, two basic network topologies are available for network configuration: an ad-hoc network and an infrastructure network. An ad-hoc network is formed by two or more independent mobile terminals without the services of a base station, i.e. in an ad-hoc network the terminals communicate on a peer-to-peer basis. An ad-hoc network is normally formed for temporary purposes. The infrastructure network, in turn, comprises one or more wireless base stations, called access points, which form part of the wired infrastructure. In a typical network of this type, all traffic goes through the access points, regardless of whether the traffic is between two terminals or a terminal and the wired network, i.e. the mobile terminals do not communicate on a peer-to-peer basis. The mobile terminals are provided with wireless LAN cards, whereby they can access the wired network or set up an ad-hoc network. In an infrastructure network an access point and at least one terminal is said to form a Basic Serving Set (BSS), while an ad-hoc network is also termed an Independent BSS (IBSS).

When a wireless terminal tries to access an infrastructure network, the user of the terminal is authenticated before the terminal may become a member of the infrastructure network. After the authentication has been performed and the terminal has associated itself with the infrastructure network, the user may start to use the services available through the relevant access point.

When using the services available through the access points of various networks, such as corporate or home networks, the user may also wish to establish or join an ad-hoc network. For example, the user might wish to download content, such as music, from a near-by terminal or play a game with a user of another terminal while simultaneously being associated with an infrastructure network. A drawback related to the current networks is that if the user enters the ad-hoc operation mode, the existing association in the infrastructure network is removed. In other words, the user of the terminal has to be authenticated again and a new association has to be created when the user leaves the ad-hoc mode and re-enters the infrastructure network. This drawback relates to the fact that in a beacon-based system the terminals have to monitor the information broadcast in the beacon frames. In the infrastructure networks, each access point sends beacon frames at regular intervals, and the terminals synchronize their operation with the rhythm of the beacon transmissions. The beacon transmissions include, for example, timing information and information about the capabilities of the transmitting access point. At present, simultaneous operation in two different beacon-based networks is not possible, but an existing association in one network is lost if another network is entered.

The present invention seeks to accomplish a solution by means of which the above drawbacks of wireless beacon-based networks may be alleviated.

SUMMARY OF THE INVENTION

The present invention seeks to devise a new mechanism for the operation of short-range wireless terminals in beacon-based networks, allowing the terminals to operate in one network, such as an ad-hoc network, without leaving another network, such as the infrastructure network.

In the present invention, a terminal moves to a power save state with respect to a first beacon-based network, such as an infrastructure network, if operation in a second beacon-based network, such as ad-hoc network, is required. However, the first beacon-based network is only informed that the terminal moves to the power save state and instead of powering down, the terminal becomes active in the second beacon-based network. While active in the second beacon-based network, the terminal receives beacons of the first beacon-based network at substantially regular intervals, i.e. the operation in the second beacon-based network is suspended at regular intervals for receiving data from the first beacon-based network, and for checking whether operation in the second beacon-based network may be continued. While receiving the beacon of the first beacon-based network the terminal remains in the power save state with respect to the first beacon-based network. The power save state thus refers to a state during which the terminal saves its battery and is awake only in a predefined manner to check whether there is data buffered for it by another element in the same network.

Thus one embodiment of the invention is the provision of a method for controlling a short-range wireless terminal capable of operating in a first beacon-based network and in a second beacon-based network. The method includes the steps of controlling the short-range wireless terminal to enter a power save state with respect to the first beacon-based network and starting operation in the second beacon-based network in response to the controlling step, wherein the controlling step is performed if the short-range wireless terminal is in an active operation state with respect to the first beacon-based network when the operation in the second beacon-based network is to be started.

In a further aspect the invention provides a wireless terminal for short-range wireless networks. The wireless terminal includes a first operation mode for operating in a first beacon-based network, a second operation mode for operating in a second beacon-based network, and first control means for controlling the wireless terminal to a power save state with respect to the first beacon-based network, wherein the first control means are configured to operate in response to a command to assume the second operation mode, the command being received when the terminal is in the active operation state with respect to the first beacon-based network.

In a still further embodiment, the invention provides a computer useable medium having computer readable program code embodied therein to control a short-range wireless terminal. The computer readable program code includes a first computer readable program code portion for receiving a command to start operation in a second beacon-based network and a second computer readable program code portion for controlling the short-range wireless terminal to enter a power save state with respect to a first beacon-based network, the second computer readable program code being configured to control the short-range wireless terminal in response to the command if the short-range wireless terminal is in an active operation state with respect to the first beacon-based network when the command is received.

The invention allows the retention of the association in the infrastructure network although the mobile terminal becomes active in an ad-hoc network. Consequently, no authentication or establishment of a new association is needed when the terminal returns to operate in the infrastructure network, which enables seamless operation in the two networks. Furthermore, the solution of the invention allows the infrastructure mode to be kept "alive" for any incoming or outgoing traffic. For example, in some environments a VoIP service may be preferred due to cost issues. The solution of the invention allows incoming VoIP calls to be received and outgoing VoIP calls to be made even though the terminal is operating in an ad-hoc network.

Other features and advantages of the invention will become apparent through reference to the following detailed description and accompanying drawings.

BRIEF DESCRIPTION OF THE DRAWINGS

In the following, the invention and many of its embodiments are described more closely with reference to the examples shown in FIG. 1 to 10 in the appended drawings, wherein.

DETAILED DESCRIPTION OF THE INVENTION

Figure 1:
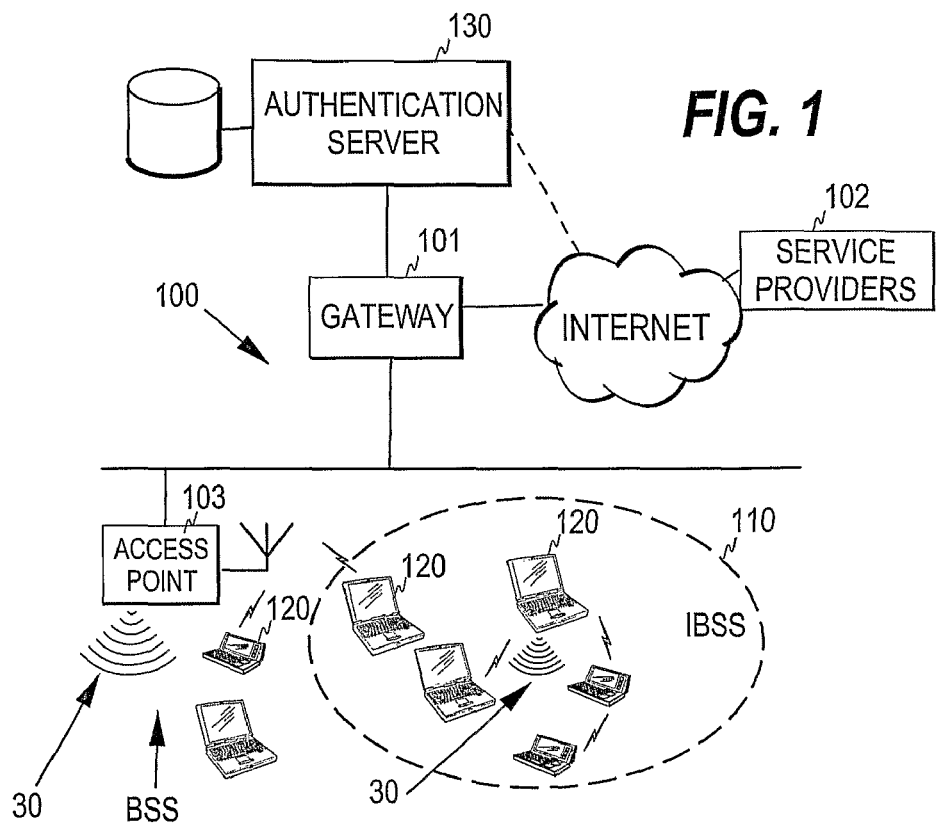
FIG. 1 illustrates an example of a communication environment including an ad-hoc network.

FIG. 1 illustrates a typical WLAN communication system. The system includes one or more WLAN networks 100, each connected by means of a gateway 101 (a router) to another network, such as the Internet, which contains service providers 102. Each WLAN network comprises one or more access points 103, each communicating wirelessly with the terminals within the coverage area, i.e. the cell, of the access point and thus forming a bridge between the terminals and the wired network.

As mentioned above, in an infrastructure network an access point and at least one terminal is said to form a Basic Service Set (BSS). A series of BSSs then forms an Extended Service Set (ESS). These BSSs are connected to each other by a Distribution System (DS), which can be a wired network, such as an Ethernet LAN, within which TCP/IP packets are transmitted, or a wireless network, or a combination of these two. However, the basic type of an IEEE 802.11 LAN is an Independent BSS (IBSS), which consists of two or more terminals. The terminals of an IBSS form an ad-hoc network 110.

The terminals of the invention are short-range wireless communication terminals, preferably based on the IEEE 802.11 standards for wireless local area networking. The terminals may be portable computers, PDA equipment, intelligent phones or other such mobile terminals 120. In the same way as an ordinary GSM telephone, the user-operated terminals may be made up of two parts: the actual subscriber device, e.g. a portable computer (with software), and an identity module, whereby from the viewpoint of the network the device becomes a functioning terminal only when the identity module has been inserted into it. The identity module may be a (Universal) Subscriber Identity Module ((U)SIM), User Identity Module (UIM) or a (User) Integrated Circuit Card ((U)ICC), for example. However, the terminals may equally well be traditional WLAN terminals in which no identity module is used. In the present invention, the terminals active in the ad-hoc network may also be associated with the infrastructure network.

The system further typically contains an authentication server 130 of the WLAN network. The authentication server is connected to the above-mentioned gateway through a secured connection, which is typically a TCP/IP connection established through an operator network or through the Internet. As discussed below, in an infrastructure network the access points broadcast beacon messages 30, while in an ad-hoc network the terminals share this responsibility.

As the present invention does not relate to the architecture of the WLAN system, it is not discussed in more detail here.

Figure 2:
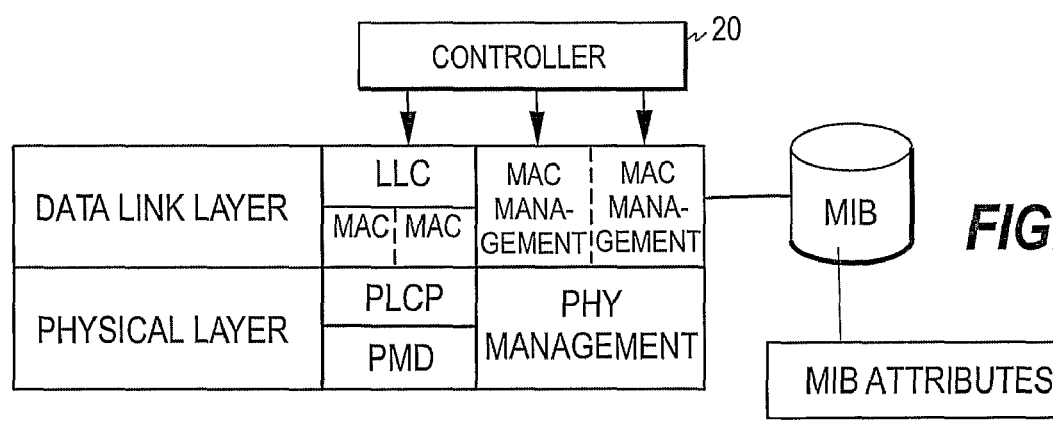
FIG. 2 illustrates the MAC entities utilized in the present invention.

The IEEE standard 802.11 defines the physical layer options and the MAC (Media Access Control) layer protocol for the wireless LAN. FIG. 2 illustrates the protocol architecture of the IEEE 802.11 standard. As shown in the figure, the actual MAC protocol operates in the lower sub-layer of the second layer of the OSI layer model, which is the Data Link Layer (DLL). The MAC management layer supports the association and roaming functionalities and it further controls the power saving functions, the authentication and encryption mechanisms, and synchronization of the terminals, for example. The MAC management layer further maintains a MAC layer management database, i.e. the MIB (Management Information Base) of the MAC layer. The MAC layer cooperates with the physical management layer to maintain the database.

The physical layer is divided into two sub-layers, which are the PLCP (Physical Layer Convergence Protocol) sub-layer and the PMD (Physical Medium Dependent) sub-layer. The purpose of the PLCP is to provide minimum dependence on the PMD in order to simplify the interface between the physical layer and the MAC layer.

A simple solution for being simultaneously associated with ad-hoc and infrastructure networks is to have two entirely separate interfaces in the terminal, each with its own radio and antenna. However, this is an impractical solution since it increases the costs of the terminal, requires more space, and creates interference problems, for example. In the following embodiments of the invention it is therefore assumed that the terminal is provided with a single physical radio.

Figure 3:
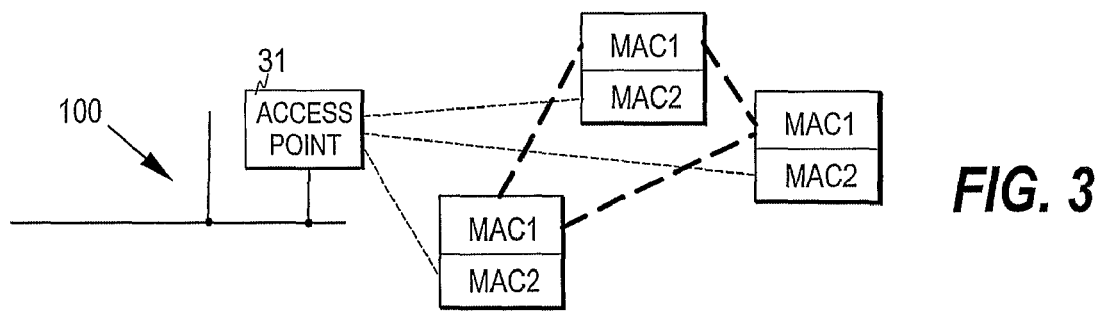
FIG. 3 illustrates an embodiment of a system of three terminals operating in the ad-hoc mode while simultaneously being associated with an access point of an infrastructure network.

In one embodiment of the present invention, two logical MAC entities are introduced into a terminal provided with a single physical radio. In other words, the MAC and the MAC management layers comprise logically separate MAC entities for both the infrastructure mode and the ad-hoc mode. This may be implemented by using two MAC entities, each with a dedicated MAC address, or by using a single MAC entity and multiplexing traffic on a frame-by-frame basis depending on the addressing and knowing the membership of the IBSS. FIG. 2 illustrates the former alternative by showing two parallel MAC and MAC management layers controlled by a controlling entity 20. From a logical point of view, the wireless terminal thus comprises two MAC entities sharing a common radio; one MAC entity for joining and operating in an infrastructure BSS and the other one for joining and operating in an IBSS. This is illustrated in FIG. 3, where three terminals are members of an IBSS through their first logical MAC entity, denoted with MAC1 in the figure, while being further associated with an infrastructure access point 31 through their second logical MAC entity, denoted with MAC2 in the figure.

If the two MAC entities operate on different channels, there is no possibility of a collision between two MAC transmissions. However, since there is only a single radio, each MAC entity will only have part-time access to the radio. Therefore, the terminal has to be provided with a mechanism for allocating the radio resources to the two logical MAC entities.

In one embodiment of the invention, a so-called slotted approach is adopted for allocating the radio resources. In the slotted approach, the operations of the infrastructure and ad-hoc modes are coordinated so that in each mode data is transmitted during defined periods, which are not overlapping with the transmission periods of the other mode.

Figure 4:
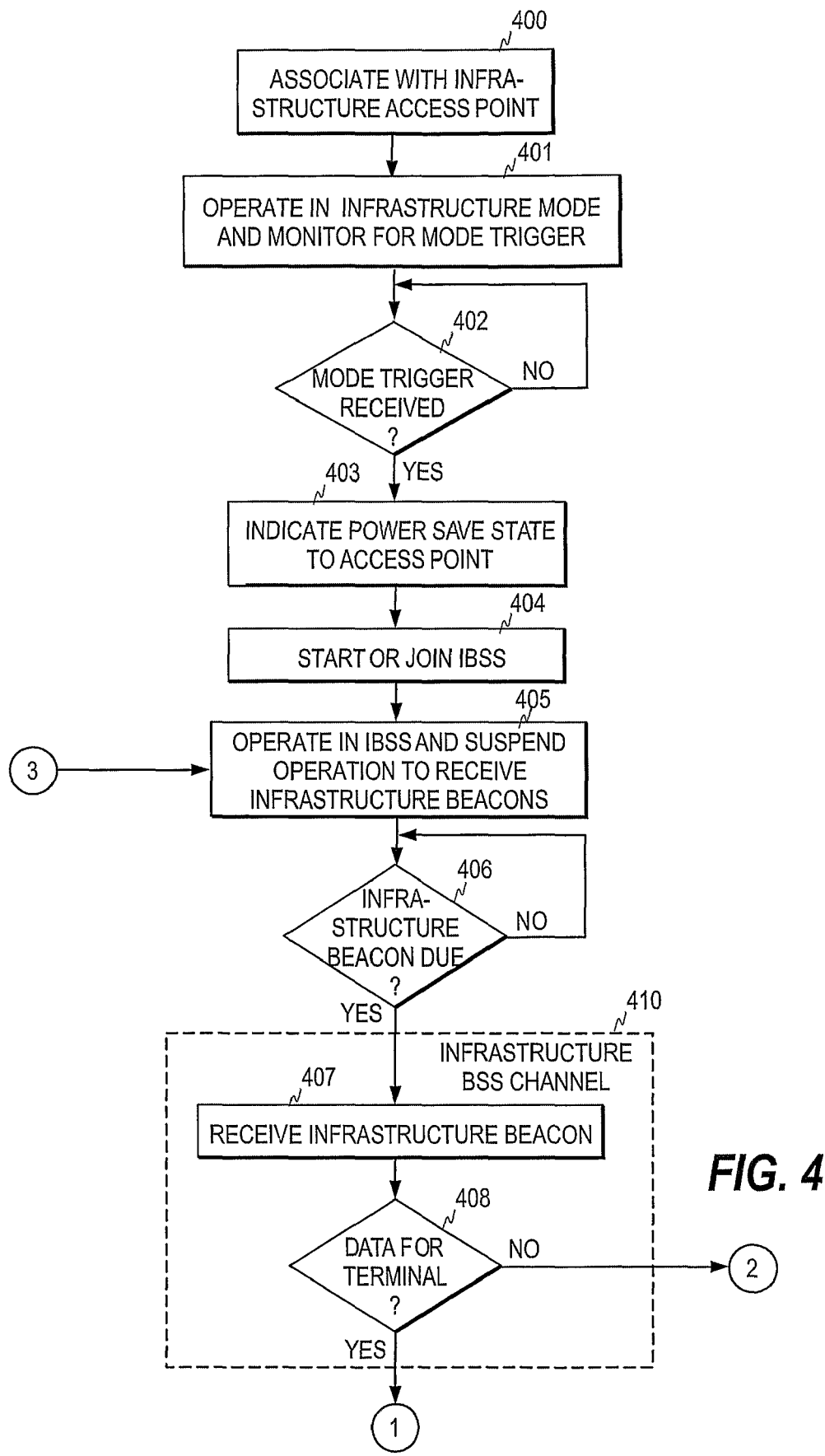
FIG. 4 to 6 are flow diagrams illustrating the operation of a wireless terminal according to one embodiment of the invention.
Figure 5:
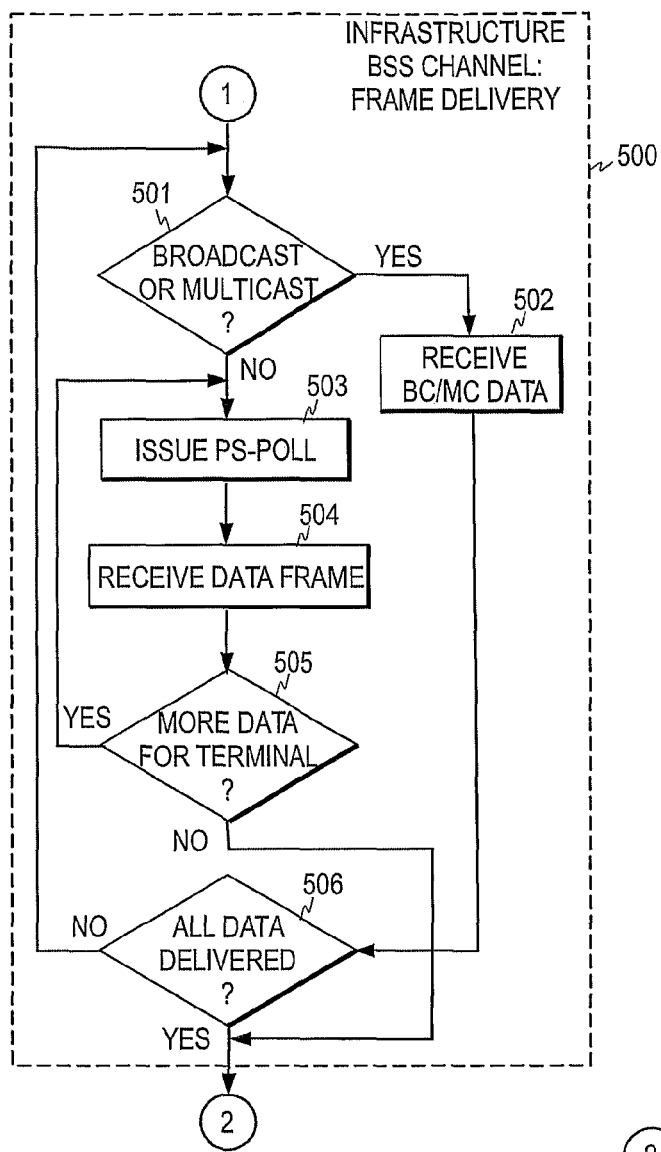
Figure 6:
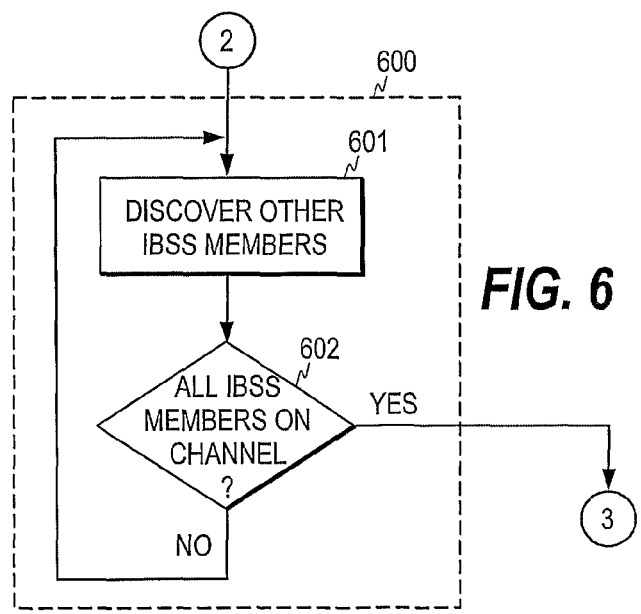

The slotted approach embodiment thus requires that no transmissions are made to IBSS terminals that might be communicating with an infrastructure access point. Similarly, the infrastructure access point may not transmit to any terminal of the IBSS during a period when the IBSS is in operation. To achieve this, the power save state defined by the WLAN standards is utilized. According to the standards, a terminal can indicate to an access point that it is entering the power save state. The access point will then assume that the terminal is powered down and will queue pending traffic until an agreed time in the future when the station will again enter the active mode. In the present invention, the terminal informs the access point that it is about to enter the power save state but, instead of powering down, the terminal moves to another channel and participates in an IBSS. FIG. 4 to 6 are flow diagrams that illustrate the operation of a terminal according to one embodiment of the invention. FIG. 4 illustrates the operation of a terminal when it joins an infrastructure network, moves to an IBSS, without disassociating from the infrastructure network, and periodically listens for beacons in the infrastructure network while operating in the IBSS. FIG. 5 illustrates the reception of data from the access point during the IBSS operation, and FIG. 6 illustrates the operation of the terminal when it reverts back to the ad-hoc mode after having received data from the access point.

Referring to FIG. 4, the wireless terminal first accesses an infrastructure network by associating with an access point of that network (step 400). In this connection, the terminal may inform the access point about the length of the listening interval to be used in power save state.

Having associated with the access point, the wireless terminal may operate in the infrastructure network in a normal manner. In the background, the terminal monitors whether the ad-hoc mode is to be entered (step 401). If the user then decides to perform operations that require the terminal to enter the ad-hoc mode, a mode trigger, i.e. a command to enter the ad-hoc mode, is generated. When the terminal detects that the ad-hoc mode is to be entered (step 402), it informs the access point that it is about to enter the power save state (step 403). This may be performed in a normal manner by using the power management bit to indicate the new power management mode of the terminal.

Having informed the access point about its power save state, the terminal starts an IBSS or joins an existing IBSS (step 404). When operating in the ad-hoc mode, the terminal periodically suspends the ad-hoc operation to receive infrastructure beacons from the access point channel and to check whether the access point has buffered data for it (steps 406 to 408). Upon detecting that the access point has buffered data for it, the terminal gets ready to receive the said data. The reception of the data is discussed in connection with FIG. 5. If there is no data for the terminal, the terminal will revert back to the IBSS channel. This is discussed in connection with FIG. 6.

With reference to FIG. 5, the data buffered by the access point may be broadcast data, multicast data and/or unicast data. The access point always sends the broadcast and multicast data immediately after the beacon without waiting for PS-Poll messages, i.e. broadcast and multicast data always precedes unicast data. Therefore, if the access point has buffered broadcast or multicast data, this data is received first by the terminal (step 502). After this, if there is still buffered unicast data for the terminal, the terminal sends a PS-Poll frame to the access point (step 503) and the access point responds by sending a directed data frame to the terminal (step 504). The terminal continues to issue a PS-Poll message as long as there are directed data frames left for it or as long as it decides to receive the said data. By issuing the PS-Poll messages, the terminal may thus regulate the frame delivery from the access point. Instead of the above-described mechanism in which one PS-Poll message triggers the sending of one directed data frame, any appropriate mechanism may be utilized to transfer directed data frames to the terminal.

FIG. 6 illustrates, in one embodiment of the invention, the operation of the terminals when they revert back to the ad-hoc mode. Before the actual IBSS operation may start again (step 405 in FIG. 4), the terminal may discover the other terminals that are members in the IBSS (step 601). When all members are on the IBSS channel, the IBSS operation resumes, i.e. the terminals jump to step 405. The discovery of the other IBSS members may be performed, for example, by sending polling messages. All terminals that respond within a period of predetermined length then form the IBSS when the IBSS operation resumes.

Figure 7:
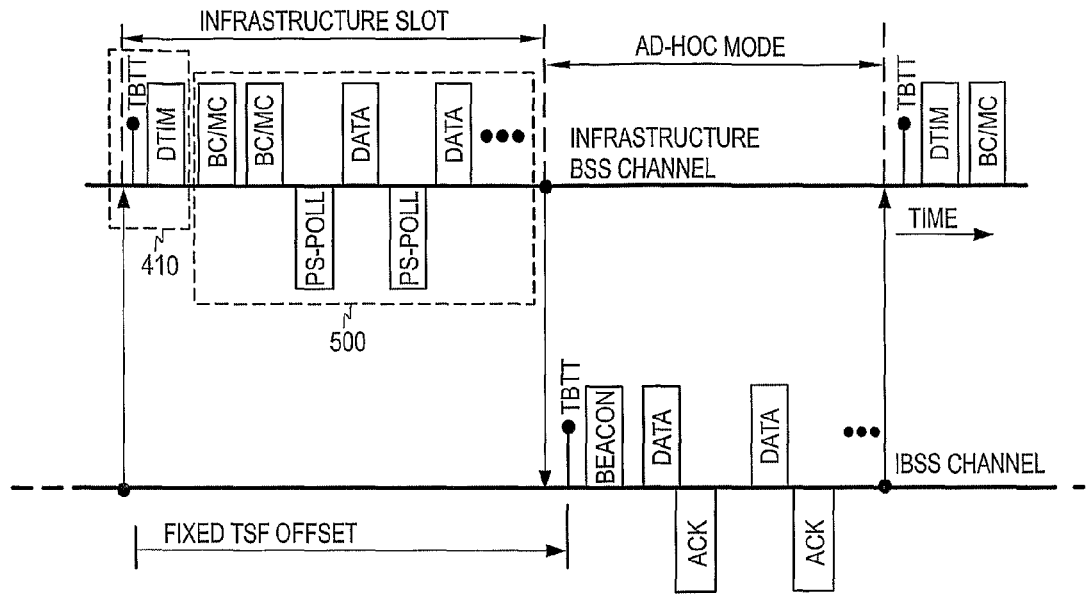
FIG. 7 is a time line illustrating the operation of a wireless terminal in one embodiment of the invention.

FIG. 7 is a time line illustrating the basic operation of a terminal in one embodiment of the invention. It is assumed in the figure that the IBSS has already been established and that the terminal has informed the access point of the infrastructure network about its power save state. The terminal may also have entered the power state earlier, i.e. it may already be in the power save state when a command to start operation in the ad-hoc network is received from the user.

As illustrated in FIG. 7, the operation of the IBSS is suspended for certain periods, which are here termed infrastructure slots. Each infrastructure slot starts when a beacon defined by the infrastructure listening interval of the terminals is due, and ends when the terminals resume the IBSS operation. The infrastructure listening interval here refers to the number of infrastructure beacon intervals between two consecutive infrastructure slots. It is assumed in the example of FIG. 7 that each beacon of the infrastructure network is received during the ad-hoc mode, i.e. that the infrastructure listening interval is one. However, the infrastructure listening interval may also be a multiple of the infrastructure beacon interval, especially if the period between successive DTIMs (delivery traffic indication messages) in the infrastructure network is a multiple of the beacon interval. The length of the infrastructure listening interval may also depend on the requirements of the applications running in the IBSS, for example. Moreover, different terminals of the IBSS may use infrastructure listening intervals of different lengths, although communicating terminals typically use the same infrastructure listening interval.

In the infrastructure mode, the access point is the timing master that is responsible for the timing synchronization function (TSF). In a beacon frame, the access point transmits a timestamp, which is a copy of its TSF timer, to synchronize the terminals associated with the access point. If the TSF timer of a terminal is different from the received timestamp, the terminal will set its timer to the received timestamp value. In an IBSS, a terminal updates its TSF timer from the timestamp only if the value is greater than its own TSF timer. Therefore in an IBSS, the TSF timer runs at the rate of the fastest TSF timer of the IBSS terminals. This causes the moments of the TBTTs of the two networks to drift relative to each other. The drift may be eliminated by maintaining a fixed offset between the two TSF timers maintained in the terminal. The TSF timer of the infrastructure mode may be updated directly based on the timestamp of the infrastructure beacon received, while the TSF timer of the IBSS may be updated by means of the said timestamp and the fixed offset. Between the infrastructure beacons, the TSF timer of the IBSS may further be updated by means of the timestamps in the IBSS beacons.

Figure 8:
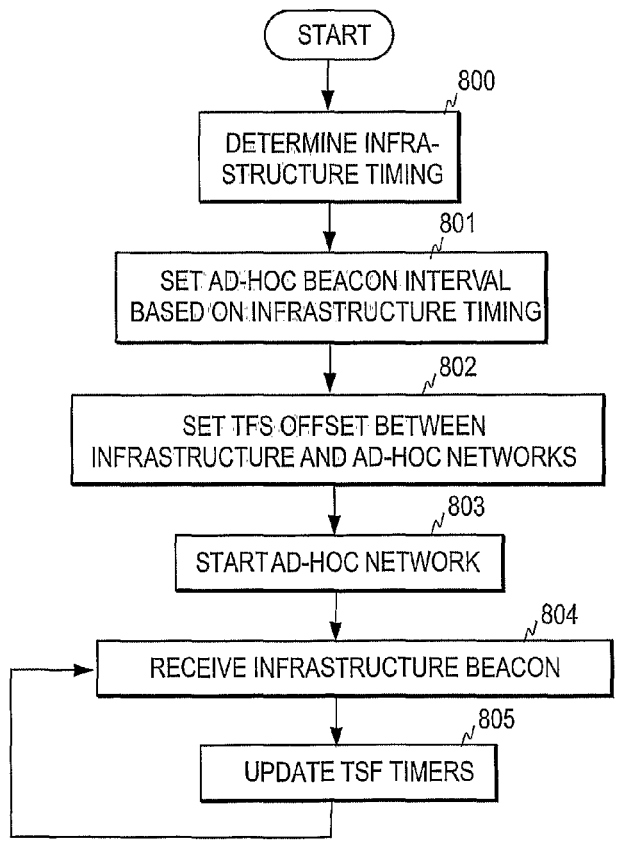
FIG. 8 is a flow diagram illustrating the synchronization of the ad-hoc and infrastructure modes of a terminal according to one embodiment of the invention.

FIG. 8 illustrates the timing operation in one embodiment of the invention. The operation shown typically involves the terminal establishing the IBSS. First, the terminal determines the infrastructure timing at step 800, i.e. the terminal determines the beacon interval in the infrastructure network. The terminal then sets (step 801) the IBSS beacon interval to a certain value, which is typically equal to the beacon interval in the infrastructure network or a multiple thereof, and sets a fixed TSF offset (cf. FIG. 7) between the two networks (step 802). The IBSS is then started with the above parameter values, i.e. so that the time difference between successive beacons of the two networks corresponds to the set offset value and the beacon interval in the IBSS corresponds to the set interval value. Each member of the IBSS receives the parameters by a known mechanism. The parameters may also include the value of the infrastructure listening interval. When the IBSS has started to operate, each terminal receives the infrastructure beacon during the above-described infrastructure slot and updates the TSF timers based on the received timestamp and the set offset value (steps 804 and 805).

Since the TSF timers of each terminal are synchronized with each other and all stations know the TBTT of the access point, they also know when they must switch from the IBSS channel to the access point channel. The terminals remain on the access point channel until the access point has delivered all the broadcast/multicast traffic and all the directed traffic to the members of the IBSS. Alternatively, each terminal may leave the access point channel immediately after having received its own traffic. Thus, the terminals may revert back to the IBSS synchronously or non-synchronously. This is discussed briefly in the following.

Since the beacon sent by the access point indicates the terminals for which the access point has buffered data, this may be utilized so that the terminals return to the IBSS channel synchronously. In one embodiment of the invention, each terminal of the IBSS may determine the other members of the IBSS for which the access point has dedicated data. In addition, each station in the IBSS can track the "more data" bit in frames directed to the members of the IBSS, and determine when there are no more frames buffered for any member of the IBSS. At this point, the stations in the IBSS can revert back to the IBSS channel. However, the normal ad-hoc operation also allows the terminals to return to the IBSS channel non-synchronously. In an ad-hoc network an ATIM frame is sent by a terminal to indicate to another terminal that buffered data waits to be delivered to the said another terminal. As a dedicated ATIM frame has to be acknowledged by the receiving terminal, this mechanism also indicates if the receiving terminal has returned to the IBSS. In other words, if an ATM frame is not acknowledged, the sending terminal assumes that the receiving terminal has not yet returned to the IBSS.

In connection with an infrastructure slot, different types of data may be received for different types of applications. Upon receiving data in connection with an infrastructure slot, the terminal may decide, depending on the application in question, whether it remains in power save state or returns to active mode with respect to the infrastructure mode. For example, if a VoIP application detects that there is an incoming call for the terminal, the terminal may either return to active mode with respect to the infrastructure network or continue to switch between the two networks in the above-described manner (i.e. remain in the power save mode with respect to the infrastructure network). In the latter case, the infrastructure listening interval may be shortened in order to reduce the reception delay. In the former case, the terminal may, if otherwise possible, inform the other members of the IBSS that it enters the power save state. However, this may not be necessary in environments where a transmitting terminal will in any case transmit a notification prior to transmitting the actual data frame. Depending on the incoming data, an application may also command the terminal to leave the IBSS. Leaving the IBSS may also be necessary whenever the infrastructure assumes that the terminal is always present in the active state.

The timing of the IBSS operation may also be carried out so that the IBSS terminal broadcasting beacons updates its TSF timers in the above-described manner and broadcasts an additional timestamp that indicates the start of the next infrastructure time slot. This allows the infrastructure listening interval to be changed by the said terminal on an interval-by-interval basis.

It was assumed above that all terminals in the IBSS are in the range of one another. However, a new terminal may not be in the coverage area of the access point with which the terminals in the IBSS are associated. A simple way to handle this is to ban the terminal from joining the IBSS. However, another access point may be in the range of all terminals. This may be tested so that each new station gives, when attempting to join, a list of all access points that are in its range (this is likely to be a small number). If this information is known for each terminal in the IBSS, the beacon terminal (i.e. the terminal having the responsibility of broadcasting the beacon) may determine whether it is possible to move to a new access point. If there is no new access point available, the joining of the new terminal may be refused. If a suitable access point is found, the terminals of the IBSS may desire to roam to that access point. The roam may also be mandatory because the access point either disappears or because one or more of the IBSS terminals simply travel out of the range of the access point. If the access point to roam to is already known, the operation of the IBSS may be suspended while the beacon terminal associates with the new access point. Once the beacon terminal returns and starts to send the beacon, the other stations may join the IBSS as if from the scratch. If the new access point is not yet known, the terminals may scan for access points and send the results to the beacon terminal. The beacon terminal may then select the best access point and the procedure described above may be invoked.

In the following, an example of the process of a new terminal joining an existing IBSS is discussed in more detail. The new terminal may first scan for the IBSS and receive either a beacon or a probe response. The terminal then obtains information on the access point with which the other stations are associated in the infrastructure BSS. This may be obtained by means of an appropriate information element in the beacon or by means of a request-response protocol. Once the new terminal has received information about the access point, it scans for that access point and associates with it. It may then revert back to the IBSS channel and once again scan for the IBSS. Once it has located the IBSS, it sends a directed frame to the IBSS terminal that sent the beacon or probe response, announcing that it is joining the IBSS and giving its association identifier with respect to the infrastructure access point. The beacon terminal then sends directed frames to all members of the IBSS indicating that a new terminal is joining the IBSS. The new terminal tracks these frames and builds a database of all terminals in the IBSS. Finally, the beacon terminal informs the new terminal that the joining is complete and at the same time grants a new association identifier for the IBSS and informs the necessary parameters to the terminal. The reason for using directed frames rather than multicast is to ensure reliability. In addition, power-saving may be active in the IBSS so the new terminal is only guaranteed that the beacon terminal is awake. The beacon terminal may relay the information to all terminals in the IBSS when it is sure that they are awake. Until the final confirmation to the new terminal it may not send any frames to other members of the IBSS. In addition, it may hop with them to the access point channel if a beacon to be received is due, and may also receive the multicast/broadcast traffic but may revert back to the preferred channel immediately after this, without requesting any directed frames from the access point. The beacon terminal does not send any of the traffic involved in the joining on the access point channel but waits until the terminal has reverted back to the IBSS channel.

It is to be noted that when the beacon terminal receives the original request from the new terminal, it might be the only terminal in the IBSS that is awake. It will then wait until the next beacon and announce the frames it wishes to send using ATIMs. When each of the other terminals in the IBSS receives the frame indicating that a new terminal is trying to join, it must remain awake until the joining process is complete.

In another embodiment of the invention, the infrastructure access point and the IBSS operate on the same channel, i.e. the IBSS is either established onto the channel of the access point or the terminals of the IBSS move to that channel. The process of moving the IBSS to another channel may be utilized in connection with the IBSS roaming to the coverage area of another access point. The selection of the IBSS channel is mainly a capacity, interference and timing issue. If the access point channel is selected for the IBSS, there is most likely interference on the channel since there are most likely also other terminals on the same channel, which are not members of the IBSS but wish to communicate with the access point. This also detracts from the performance of the terminals and the access point. If another channel than the access point channel is selected for the IBSS, a sufficient guard time is to be reserved for the terminals to switch between the two channels.

Figure 9:
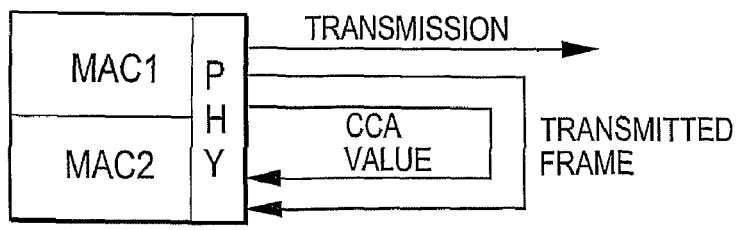
FIG. 9 illustrates one embodiment of the operation of two MAC entities sharing a common radio resource.

Using the above mechanism, the common radio resources may be shared by the two operation modes. In addition, a collision avoidance mechanism may be used to prevent the MAC entities from trying to use the common radio resources simultaneously. For this, a mechanism based on the virtual carrier-sense mechanism of conventional networks may be utilized. In conventional networks, the terminals maintain an indicator, termed Network Allocation Vector (NAV), which indicates when the medium is reserved for another terminal. The terminals maintain this information and use it together with the physical carrier sense in order to detect the busy states of the medium. The logical function in the physical layer that determines the current state of use of the medium is commonly termed the clear channel assessment (CCA) function. This mechanism may be also utilized in the dual MAC terminal of the invention, as is illustrated in FIG. 9. First, the transmitted data frame is looped back to the non-transmitting MAC entity, which enables the non-transmitting MAC entity to set its NAV value and to refrain from transmitting a colliding frame. Second, a logical CCA value is generated, indicating to the non-transmitting MAC entity that the channel is in use. The collision avoidance mechanism of FIG. 9 may be used, for example, to prevent the terminal from starting a joining procedure when operation in infrastructure mode continues.

Figure 10:
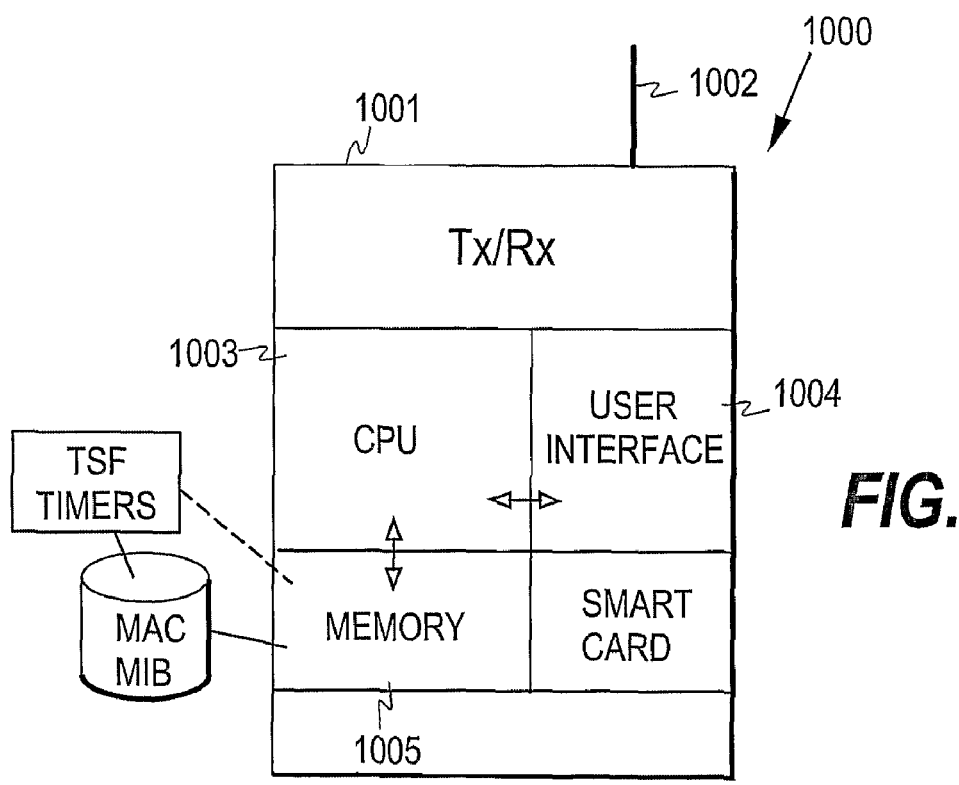
FIG. 10 is a block diagram illustrating the basic elements of a terminal according to one embodiment of the invention.

FIG. 10 illustrates the basic elements of the terminal according to one embodiment of the invention. The mobile terminal 1000 comprises a transceiver 1001 provided with at least one antenna 1002, a control unit 1003, user interface means 1004 for creating a user interface through which the user can operate the terminal, and memory means 1005, which may include one or more smart cards 1006, such as one of the above-mentioned identity modules. However, as discussed above, an identity module is not included in a traditional WLAN terminal. The control unit performs the basic functions of the invention, i.e. it controls the terminal to the power save state with respect to the infrastructure mode if the operation is to be continued in the ad-hoc mode, and maintains the above-described slotted operation. The memory means include the MAC MIB, which may include the control information needed for the functions, such as the timing information needed for the infrastructure slots.

The data processing environment of the control unit may resemble that of an ordinary PC, and the client software, including the novel features of the invention, may be delivered separately to the wireless terminal, for example in a multimedia card. It is also possible that the novel features, i.e. the program code that causes the control unit to handle the transfer to the power state in response to a command to enter ad-hoc mode, are delivered as a plug-in software module to terminals that are provided with conventional client software. The plug-in may also be downloaded to the terminal via the network.

It was assumed above that all IBSS terminals listen to the infrastructure beacons. However, it is also possible that some of the IBSS terminals communicate with each other during the infrastructure slot. In this case, the network includes a mechanism that allows a terminal that does not suspend its operation for the duration of the infrastructure slot to detect if a terminal to which it intends to send data does suspend its operation for the duration of the infrastructure slot.

Although the invention was described above with reference to the examples shown in the appended drawings, it is obvious that the invention is not limited to these, but may be modified by those skilled in the art without departing from the scope and spirit of the invention. Thus, although the invention was illustrated above with the help of the IEEE 802.11 standard, the invention may also be used in connection with any similar beacon-based systems. Furthermore, a terminal may have different operation states from which the power save state may be entered, i.e. the active operation state refers generally to any state in which the terminal is not asleep.

The invention claimed is:

1. A method comprising:
   operating a wireless device in a first beacon-based network;
   informing the first beacon-based network that the wireless device enters a power save state with respect to the first beacon-based network so that the wireless device is not present in the first beacon-based network while in the power save state; and
   starting operation in a second beacon-based network in response to the informing,
   wherein the informing is performed when the wireless device is in an active operation state with respect to the first beacon-based network and when the operation in the second beacon-based network is to be started.

2. A method according to claim 1, further comprising:
   suspending the operation of the wireless terminal device in the second beacon-based network; and
   receiving a beacon broadcast of the first beacon-based network during the suspending.

3. A method according to claim 2, wherein the receiving comprises receiving dedicated data for the wireless device.

4. A method according to claim 2, further comprising
   resuming the operation in the second beacon-based network, the resuming being performed in response to the receiving.

5. A method according to claim 1, wherein the starting comprises controlling the wireless device to change from a first radio frequency used in the first beacon-based network to a second radio frequency used in the second beacon-based network.

6. A method according to claim 4, further comprising:
   determining a moment for the resuming, the determining being performed during the suspending.

7. A method according to claim 6, wherein the determining further comprises:
   receiving messages of at least one other wireless device belonging to the second beacon-based network; and
   defining said moment based on the messages received.

8. A method according to claim 1, further comprising:
   maintaining a first timer for the first beacon-based network, the first timer indicating beacon broadcast moments in the first beacon-based network;
   maintaining a second timer for the second beacon-based network, the second timer indicating beacon transmission moments in the second beacon-based network; and
   maintaining an offset between the first timer and the second timer.

9. A method according to claim 3, further comprising:
   returning the terminal back to the active operation state with respect to the first beacon-based network, the returning-step being performed in response to the receiving of the dedicated data.

10. A method according to claim 3, further comprising:
    resuming the operation in the second beacon-based network, the resuming being performed in response to the receiving of the dedicated data.

11. A method according to claim 8, wherein the suspending and the receiving are performed at regular intervals according to the beacon broadcast moments in the first beacon-based network.

12. An apparatus comprising:
    a first operation mode configured to operate in a first beacon-based network;
    a second operation mode configured to operate in a second beacon-based network; and
    a first controller configured to inform the first beacon-based network that the apparatus enters a power save state with respect to the first beacon-based network so that the apparatus is not present in the first beacon-based network while in a rower save state,
    wherein the first controller is configured to operate in response to a command to assume the second operation mode, the command being received when the apparatus is in the active operation state with respect to the first beacon-based network.

13. The apparatus according to claim 12, further comprising:
    a second controller configured to suspend the operation in the second operation mode substantially at selected beacon broadcast moments of the first beacon-based network.

14. The apparatus according to claim 13, wherein the second controller is configured to suspend the operation in the second operation mode at substantially regular intervals.

15. The apparatus according to claim 13, wherein the second controller comprises a first timer synchronized with timing information broadcast in the first beacon-based network.

16. The apparatus according to claim 13, further comprising:
    a controller configured to resume the operation in the second operation mode.

17. The apparatus according to claim 16, wherein the third controller is configured to control the apparatus from a first radio frequency to a second radio frequency.

18. The apparatus according to claim 15, further comprising:
    a second timer configured to indicate beacon broadcast moments in the second beacon-based network, the second timer being synchronized with the first timer.

19. A computer program stored on a computer readable medium, the computer program being configured to control a processor of an apparatus to cause the apparatus to:

operate in a first beacon-based network;

inform the first beacon-based network that the apparatus enters a power save state with respect to the first beacon-based network so that the apparatus is not present in the first beacon-based network while in the power save state;

start operation in a second beacon-based network in response to the informing;

wherein the informing is performed when the apparatus is in an active operation state with respect to the first beacon-based network and when the operation in the second beacon-based network is to be started.

\* \* \* \* \*